Aug. 19, 1924.

L. TRAGER 1,505,612

DEFORMABLE SPACER

Original Filed Dec. 21, 1922

Inventor
Leon Trager
By his Attorneys

Patented Aug. 19, 1924.

1,505,612

UNITED STATES PATENT OFFICE.

LEON TRAGER, OF NEWARK, NEW JERSEY, ASSIGNOR TO WORTHINGTON PUMP AND MACHINERY CORPORATION, OF NEW YORK, N. Y., A CORPORATION OF VIRGINIA.

DEFORMABLE SPACER.

Original application filed December 21, 1922. Serial No. 608,377. Divided and this application filed December 21, 1922, Serial No. 608,379. Renewed June 25, 1924.

*To all whom it may concern:*

Be it known that I, LEON TRAGER, a citizen of the United States, residing at Newark, county of Essex, and State of New Jersey have invented certain new and useful Improvements in Deformable Spacers, fully described and represented in the following specification and the accompanying drawings, forming a part of the same.

This invention relates to an improved deformable safety device or spacer which may be advantageously used with any sectional casing enclosing a pressure or vacuum space, such as steam or gas chambers, liquid chambers liable to freezing, flanged pipe joints, safety valve casings, and the like, and it is the particular aim of the invention to provide a deformable spacing member having the characteristics of sufficient resiliency to absorb light sudden shocks without being deformed beyond the limit of elasticity, but which, when forced beyond the limit of elasticity by excessive pressures, which would ordinarily cause rupture of the casing or the like, will bend or take a permanent set so as to permit separation of the casing or like parts to enable the passage of fluid to or from the casing. The spacer preferably will be of such form as to permit of the casing joint being thereafter closed by merely tightening up the clamping devices comprising bolts or the like, and thus enable such spacers to be used two or more times after they have been thus deformed beyond the point of elasticity.

In the accompanying drawings forming a part of this specification, the invention is illustrated in modified forms as applied to the flanges of the sectional casing or chamber in which a pressure fluid may be confined, and the invention will now be described in detail in connection with said drawings and the novel features thereof then be specifically pointed out in the claims.

In the drawings—

Figure 1:
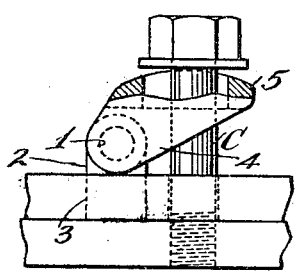
Figures 1 and 2 are, respectively, a detail end view and a view looking to the left in Fig. 1.
Figure 2:
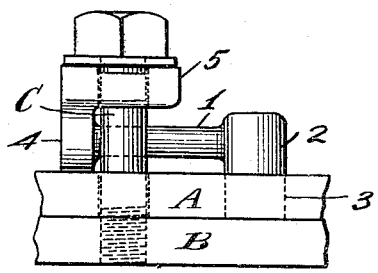

Referring now to the drawings, and particularly to Figs. 1 and 2, the spacer shown comprises a horizontal torsion member 1, formed with a lug 2 at one end thereof, such lug being arranged to be received in a suitable cavity 3 in flange A of one of the casing sections, and at its other end the torsion member 1 is provided with a head 4 arranged to rest and turn on the flange A, such head having an offset member 5 adapted to engage a clamping device shown as a bolt C which passes through the member 5 with the head of the bolt arranged to contact with the top of the member 5, a large clearance being provided around the shank of the bolt to prevent it binding on the member 5 in the operation of the device hereafter described. The bolt is threaded into the lower casing flange B to draw the casing sections together.

Figure 3:
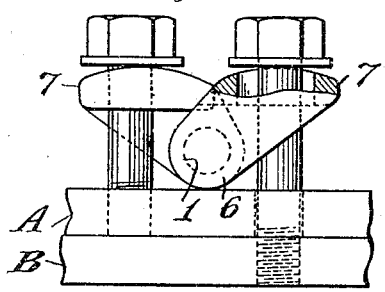
Figures 3 and 4 are, respectively, a side and top view of a modified construction.
Figure 4:
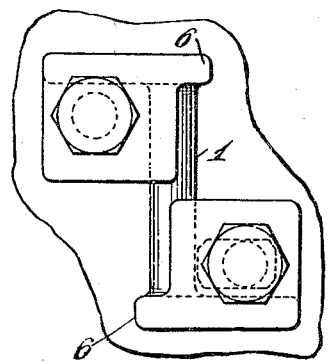

In Figs. 3 and 4, the torsion member 1 carries heads 6 and bolt-engaging members 7, thus doing away with the lug 2 and its seating cavity 3.

From the foregoing it will be obvious that when the sections of the pressure chamber are forced apart by excessive pressure therein, the casing sections and flanges A, B in separating will produce a twisting or torsional bending action of the torsion member 1, due to the pressure of the bolt heads on the offset members 5 or 7, as the case may be.

The spacers are preferably made of extruded or drop forged brass and the deformable members 1 are of such resiliency and strength as to yield slightly under sudden slight shocks and react to return the parts to normal position. On excessive pressures, however, which otherwise would rupture the casing, the torsion members 1 are twisted beyond the limit of their elasticity and take a permanent set with the casing parts separated. The form of the members 1 and 4, of Figs. 1 and 2, and 1 and 7, of Figs. 3 and 4, is such that, on subsidence of the pressure causing separation of the casing parts, the bolts C may be tightened to close the parts of the casing together on the spacers, and the constructions may be used a second time, or until the limit of movement of the parts is reached.

It will be understood that the invention is not limited to the exact form or construction of any of the devices shown, but that these may be modified widely within the invention as defined by the claims, and that the term "spacer" is intended to cover any member which co-acts with the means for securing casing parts together, so as to support the pressure holding the parts together and permit them to separate by deforming the spacers.

This is a division of my application Serial No. 608,377, filed December 21, 1922.

What is claimed is:

1. The combination with a sectional casing and the means for securing the casing parts together, of a yielding spacer supporting the pressure of said securing means and torsionally deformable under excessive pressures tending to separate the casing parts, said spacer being of such resiliency as to be torsionally deformed beyond its elastic limit and take a permanent set with the casing parts separated on excessive pressure within said casing.

2. The combination with a sectional casing and the means for securing the casing parts together, of a resilient spacer supporting the pressure of said securing means and torsionally deformable under excessive pressures tending to separate the parts of the casing, said spacer being of such resiliency as to be torsionally deformed within its elastic limit under light sudden shocks and return the parts to normal position but to be deformed beyond the elastic limit and take a permanent set with the casing parts separated on excessive pressure within said casing.

3. The combination with a sectional casing and the bolts for securing the casing parts together, of resilient spacers for supporting the pressures of said bolts and torsionally deformable under excessive pressures tending to separate the parts of the casing, said spacers being of such resiliency as to be torsionally deformed within their elastic limits under light sudden shocks and return the casing parts to normal position but to be torsionally deformed beyond the elastic limit and take a permanent set with the casing parts separated when the pressure within said casing becomes excessive.

4. The combination with a sectional casing and clamping bolts therefor, of resilient spacers for supporting the pressures of said bolts and torsionally deformable under excessive pressures tending to separate the parts of the casing, said spacers being of such resiliency as to be torsionally deformed within their elastic limits under sudden light shocks and return the casing parts to normal position but to be torsionally deformed beyond the elastic limit and take a permanent set with the casing parts separated when the pressure within said casing becomes excessive, said spacers being formed to permit further torsional deformation after the casing parts have been tightened by the bolts after subsidence of such excessive pressure, whereby the spacers may be used a plurality of times.

5. A yielding spacer, comprising a member arranged to engage a clamping device, and a torsion device coacting with said member arranged to support the clamping pressure of said clamping device, said torsion device being arranged to take a permanent set when bent under excessive pressure.

6. A yielding spacer, comprising a member arranged to engage a clamping device, and a torsion device coacting with said member arranged to support the clamping pressure of said clamping device, said torsion device having sufficient resiliency to bend and react under light sudden shocks and to be deformed beyond its elastic limit and take a permanent set under continued excessive pressure.

In testimony whereof, I have hereunto set my hand.

LEON TRAGER.